(12) United States Patent
Hanks et al.

(10) Patent No.: US 8,800,124 B1
(45) Date of Patent: Aug. 12, 2014

(54) ADJUSTABLE FIXTURE FOR A MULTI-SPINDLE MACHINE

(75) Inventors: Ryan L. Hanks, Shipman, IL (US); Kevin G. Waymack, Hazelwood, MO (US); David P. Heck, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 619 days.

(21) Appl. No.: 12/623,756

(22) Filed: Nov. 23, 2009

(51) Int. Cl.
| | | |
|---|---|---|
| B23P 23/02 | (2006.01) | |
| B23C 1/08 | (2006.01) | |
| B23Q 1/42 | (2006.01) | |
| B23Q 1/46 | (2006.01) | |
| B23Q 1/44 | (2006.01) | |
| B23B 39/16 | (2006.01) | |
| B23C 1/00 | (2006.01) | |
| B23Q 1/26 | (2006.01) | |
| B23B 39/00 | (2006.01) | |
| B23B 39/18 | (2006.01) | |

(52) U.S. Cl.
CPC . *B23P 23/02* (2013.01); *B23C 1/08* (2013.01); *B23C 1/002* (2013.01); *B23Q 1/42* (2013.01); *B23Q 1/26* (2013.01); *B23Q 1/44* (2013.01); *B23Q 1/46* (2013.01); *B23B 39/006* (2013.01); *B23B 39/161* (2013.01); *B23B 39/18* (2013.01)
USPC ............ 29/26 A; 409/158; 409/212; 409/192; 409/213; 408/53; 408/43; 408/50

(58) Field of Classification Search
CPC ............ B23C 1/002; B23C 1/08; B23Q 1/42; B23Q 1/46; B23B 39/161; B23B 39/18; B23B 39/006; B23P 23/02
USPC ......... 409/202, 212, 192, 203, 213, 217, 158; 408/53, 43, 46, 50; 29/33 P, 563, 26 R, 29/26 A
See application file for complete search history.

(56) References Cited

U.S. PATENT DOCUMENTS

| | | | | | |
|---|---|---|---|---|---|
| 1,549,241 | A | * | 8/1925 | White | ............................. 74/404 |
| 4,934,202 | A | * | 6/1990 | Hikita et al. | .................. 74/89.32 |
| 4,999,895 | A | * | 3/1991 | Hirose et al. | .................... 29/33 P |

(Continued)

FOREIGN PATENT DOCUMENTS

| | | | |
|---|---|---|---|
| EP | 1600269 A1 | * | 11/2005 |
| JP | 10-080904 A | * | 3/1998 |

OTHER PUBLICATIONS

U.S. Appl. No. 11/165,829, filed Jun. 23, 2005, Young et al.

*Primary Examiner* — Erica E Cadugan
(74) *Attorney, Agent, or Firm* — Yee & Associates, P.C.

(57) ABSTRACT

A method and apparatus for processing workpieces to form parts. Tools associated with a multi-spindle machine may be positioned with respect to a plurality of workpieces on a fixture comprising a plurality of platforms and an adjustment system. Each platform may be individually moveable with respect to others in the plurality of platforms about a number of axes. The plurality of platforms may be configured to hold the plurality of workpieces in which each platform may be configured to hold a workpiece in the plurality of workpieces during operations performed by the multi-spindle machine. The adjustment system may be configured to move each of the plurality of platforms about the number of axes independently from the others in the plurality of platforms. The operations may be performed on the plurality of workpieces using the multi-spindle machine and the fixture to form a plurality of parts.

14 Claims, 11 Drawing Sheets

(56) References Cited

U.S. PATENT DOCUMENTS

| | | | |
|---|---|---|---|
| 5,429,461 A * | 7/1995 | Mukherjee et al. | 409/163 |
| 5,699,598 A * | 12/1997 | Hessbruggen et al. | 409/213 |
| 5,966,988 A * | 10/1999 | Aiso et al. | 74/89.34 |
| 6,796,199 B2 * | 9/2004 | Kurz | 74/89.32 |
| 7,234,938 B2 * | 6/2007 | Bodenmiller | 29/40 |
| 7,841,152 B2 * | 11/2010 | Young et al. | 52/749.1 |
| 2007/0137333 A1 * | 6/2007 | Geissler et al. | 74/89.23 |
| 2008/0188363 A1 * | 8/2008 | Baumbusch et al. | 29/563 |

\* cited by examiner

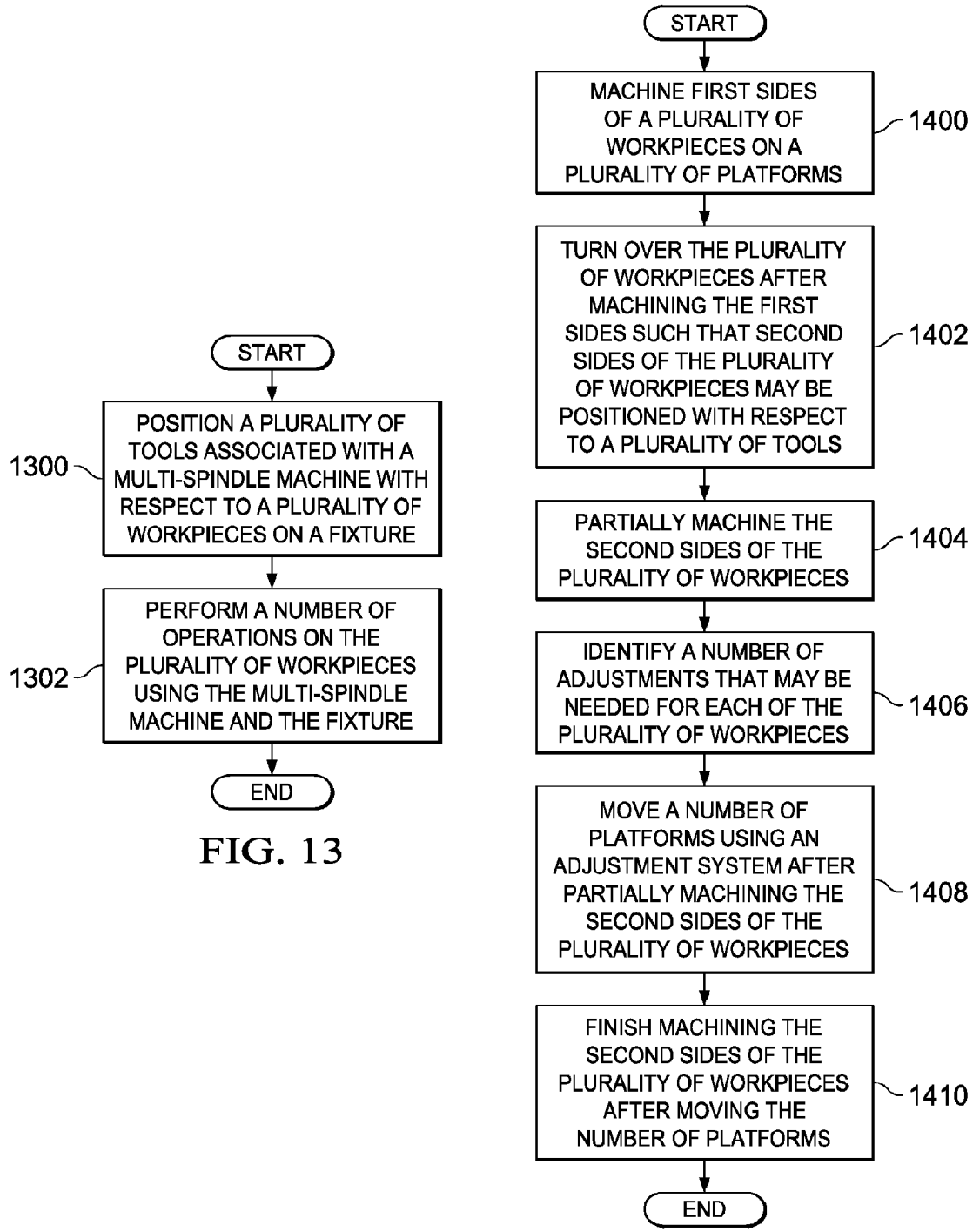

ADJUSTABLE FIXTURE FOR A MULTI-SPINDLE MACHINE

BACKGROUND INFORMATION

1. Field

The present disclosure relates generally to manufacturing and, in particular, to a method and apparatus for manufacturing parts using machines. Still more particularly, the present disclosure relates to a method and apparatus for machining workpieces with a multi-spindle machine to form parts.

2. Background

Manufacturing aircraft may require large amounts of time and expense as compared to smaller or simpler objects or structures. It may be desirable to reduce the amount of time needed to manufacture an aircraft. By reducing the amount of time needed to manufacture an aircraft, an aircraft manufacturer may deliver an aircraft to its customers earlier and receive revenues for those aircraft more quickly.

In manufacturing aircraft, the time involved in manufacturing parts for the aircraft and/or assembling the parts to form the aircraft may be greater than desired. These parts may include, for example, without limitation, brackets, structural members, spars, ribs, and/or other suitable parts.

With respect to manufacturing parts, different parts may be manufactured in a number of different ways. For example, without limitation, a number of machining operations may be performed on a workpiece to form a part. A machining operation may involve removing material to achieve a desired shape or geometry for a part. For example, without limitation, tools, such as lathes, milling machines, drill presses, and/or other suitable tools, may be used to mechanically remove material from a workpiece to form a part.

One manner in which the time needed to manufacture parts may be reduced may be to manufacture multiple parts at the same time. For example, without limitation, a multi-spindle machine may be used to perform a number of operations on multiple workpieces. A multi-spindle machine may be a machine with two or more spindles. Each spindle may hold a tool. As a result, a multi-spindle machine may be capable of performing a number of machining operations on multiple workpieces.

As an example, a structural member having a corrugated or undulating web may be formed using the multi-spindle machine. In this example, the multi-spindle machine may take the form of a multi-spindle milling machine that removes material from multiple workpieces to form these structural components. The multi-spindle machine may move all of the spindles in the same direction to machine the different parts. In this manner, higher production rates of parts may be achieved using these multi-spindle machines.

With producing parts, the tolerances, with respect to dimensions, may require some parts to be reworked or discarded. Currently, adjustments may be made with respect to the types of tools used, the speed of rotation of the spindles, and/or other suitable adjustments to the multi-spindle machine to achieve the desired tolerances more often.

Thus, it would be advantageous to have a method and apparatus that takes into account at least one or more of the issues discussed above, as well as possibly other issues.

SUMMARY

In one advantageous embodiment, an apparatus may comprise a plurality of platforms configured for use with a multi-spindle machine and an adjustment system. Each of the plurality of platforms may be individually moveable with respect to others in the plurality of platforms about a number of axes. The plurality of platforms may be configured to hold a plurality of workpieces in which each of the plurality of platforms may be configured to hold a workpiece in the plurality of workpieces during a number of operations performed by the multi-spindle machine. The adjustment system may be configured to move each of the plurality of platforms about the number of axes independently from the others in the plurality of platforms.

In another advantageous embodiment, a machining environment for forming aircraft parts using a multi-spindle machine may comprise a multi-spindle machine, a plurality of platforms, and an adjustment system. The multi-spindle machine may have a plurality of spindles and a motor system. The plurality of spindles may be configured to move together about a plurality of axes and receive a plurality of tools. The motor system may be configured to rotate the plurality of spindles with the plurality of tools during a number of milling operations. The plurality of platforms may be configured for use with the multi-spindle machine in which each of the plurality of platforms may be individually moveable with respect to others in the plurality of platforms about a number of axes. The plurality of platforms may be configured to hold a plurality of workpieces in which each of the plurality of platforms may be configured to hold a workpiece in the plurality of workpieces during the number of milling operations performed by the multi-spindle machine. The adjustment system may be configured to move each of the plurality of platforms about the number of axes independently from the others in the plurality of platforms. The adjustment system may comprise a plurality of motors connected to the plurality of platforms in which each motor in the plurality of motors may be configured to move a platform in the plurality of platforms about the number of axes. The adjustment system and the plurality of platforms may form a fixture. The fixture may further comprise a base, a plurality of channels in a surface of the base, and a plurality of protrusions from surfaces of the plurality of platforms in which the plurality of protrusions may be moveably located in the plurality of channels in the surface of the base.

In yet another advantageous embodiment, a method may be present for processing workpieces to form parts. A plurality of tools associated with a multi-spindle machine may be positioned with respect to a plurality of workpieces on a fixture comprising a plurality of platforms and an adjustment system. Each of the plurality of platforms may be individually moveable with respect to others in the plurality of platforms about a number of axes. The plurality of platforms may be configured to hold the plurality of workpieces in which each of the plurality of platforms may be configured to hold a workpiece in the plurality of workpieces during a number of operations performed by the multi-spindle machine. The adjustment system may be configured to move each of the plurality of platforms about the number of axes independently from the others in the plurality of platforms. The number of operations may be performed on the plurality of workpieces using the multi-spindle machine and the fixture to form a plurality of parts.

In still yet another advantageous embodiment, a method may be present for processing workpieces from parts. A plurality of tools associated with a multi-spindle machine may be positioned with respect to a plurality of workpieces on a fixture. The multi-spindle machine may comprise a plurality of spindles configured to move together about a plurality of axes and receive a plurality of tools and a motor system configured to rotate the plurality of spindles with the plurality of tools during an operation. The fixture may comprise a plurality of platforms, an adjustment system, a base, a plurality of guides in the base, and a plurality of engagement features configured to engage the plurality of guides in the base. The plurality of engagement features may be located on the plurality of platforms. Each of the plurality of platforms may be individually moveable with respect to others in the plurality of platforms about a number of axes. The plurality of platforms may be configured to hold the plurality of workpieces in which each of the plurality of platforms may be configured to hold a workpiece in the plurality of workpieces during a number of operations performed by the multi-spindle machine. The adjustment system may be configured to move each of the plurality of platforms about the number of axes independently from the others in the plurality of platforms. The adjustment system may comprise a plurality of adjustment units connected to the plurality of platforms in which each adjustment unit in the plurality of adjustment units may be configured to move a platform in the plurality of platforms about the number of axes. First sides of the plurality of workpieces may be machined on the plurality of platforms. The plurality of workpieces may be turned over after machining the first sides such that second sides of the plurality of workpieces may be positioned with respect to the plurality of tools. The second side of the plurality of workpieces may be partially machined. A number of adjustments for the plurality of workpieces may be identified after partially machining the second sides of the plurality of workpieces. A number of the plurality of platforms may be moved using the adjustment system after identifying the number of adjustments for the plurality of workpieces. Machining the second sides of the plurality of workpieces may be finished after moving the number of the plurality of platforms.

The features, functions, and advantages can be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 13 is an illustration of a flowchart of a process for processing workpieces in accordance with an advantageous embodiment; and FIG. 14 is an illustration of a flowchart of a process illustrating performing a number of operations on a workpiece in accordance with an advantageous embodiment.

DETAILED DESCRIPTION

Figure 1:
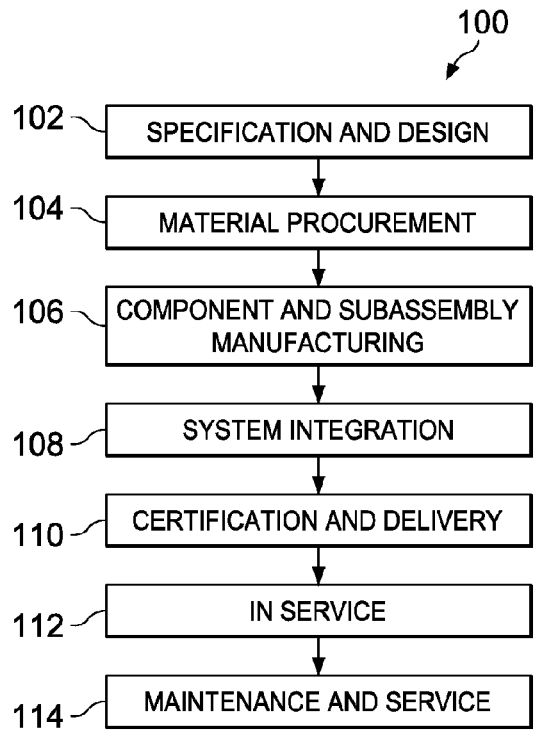
FIG. 1 is an illustration of an aircraft manufacturing and service method in accordance with an advantageous embodiment.
Figure 2:
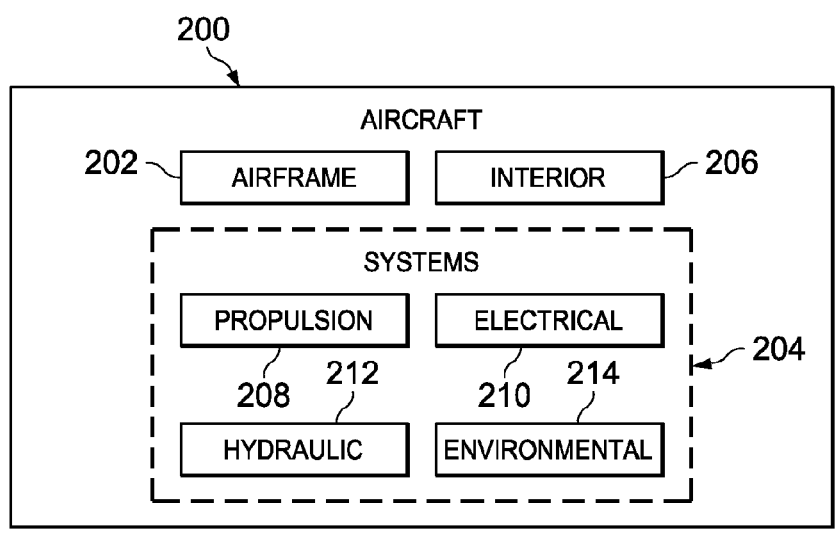
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments may recognize and take into account a number of different considerations. For example, without limitation, the different advantageous embodiments may recognize and take into account that various adjustments may be made to the multi-spindle machines. These adjustments may be used to increase the accuracy at which different operations are performed on workpieces to meet desired tolerances. These adjustments may include, for example, without limitation, changing cutting tools, adjusting a position of the cutting tools in the spindles, adjusting rotation rates of the spindles, and/or performing other suitable adjustments. Although these different parameters may be changed, tolerances for parts may still not be achieved in some cases.

The different advantageous embodiments may recognize and take into account that other factors may affect the accuracy that can be achieved. For example, without limitation, the growth or distortion of a material in a workpiece may differ from workpiece to workpiece. For example, without limitation, if the workpieces are blocks of aluminum, the blocks of aluminum may have different amounts of thermal expansion in different locations. Further, differences in the rotation speed of tools may change the rate at which a part distorts or grows.

Thus, the different advantageous embodiments may recognize and take into account that adjusting the different workpieces independently from one another on the multi-spindle machine may result in parts that are closer or within the desired tolerances. In other words, each workpiece may be adjusted based on operations already performed on the workpiece. These adjustments may be made for a workpiece in a manner that is independent of adjustments that may be made for other workpieces on which operations may be performed to manufacture parts.

The different advantageous embodiments may provide a method and apparatus for machining parts. In one advantageous embodiment, an apparatus may comprise a plurality of platforms and an adjustment system. The plurality of platforms may be configured for use with a multi-spindle machine in which each of a plurality of platforms may be individually moveable with respect to others in the plurality of platforms along a number of axes. The plurality of platforms may be configured to hold a plurality of workpieces in which each platform in the plurality of platforms may be configured to hold a workpiece in the plurality of workpieces during a number of operations performed by the multi-spindle machine. The adjustment system may be configured to move each of the platforms along the number of axes independently from the others in the plurality of platforms.

Figure 3:
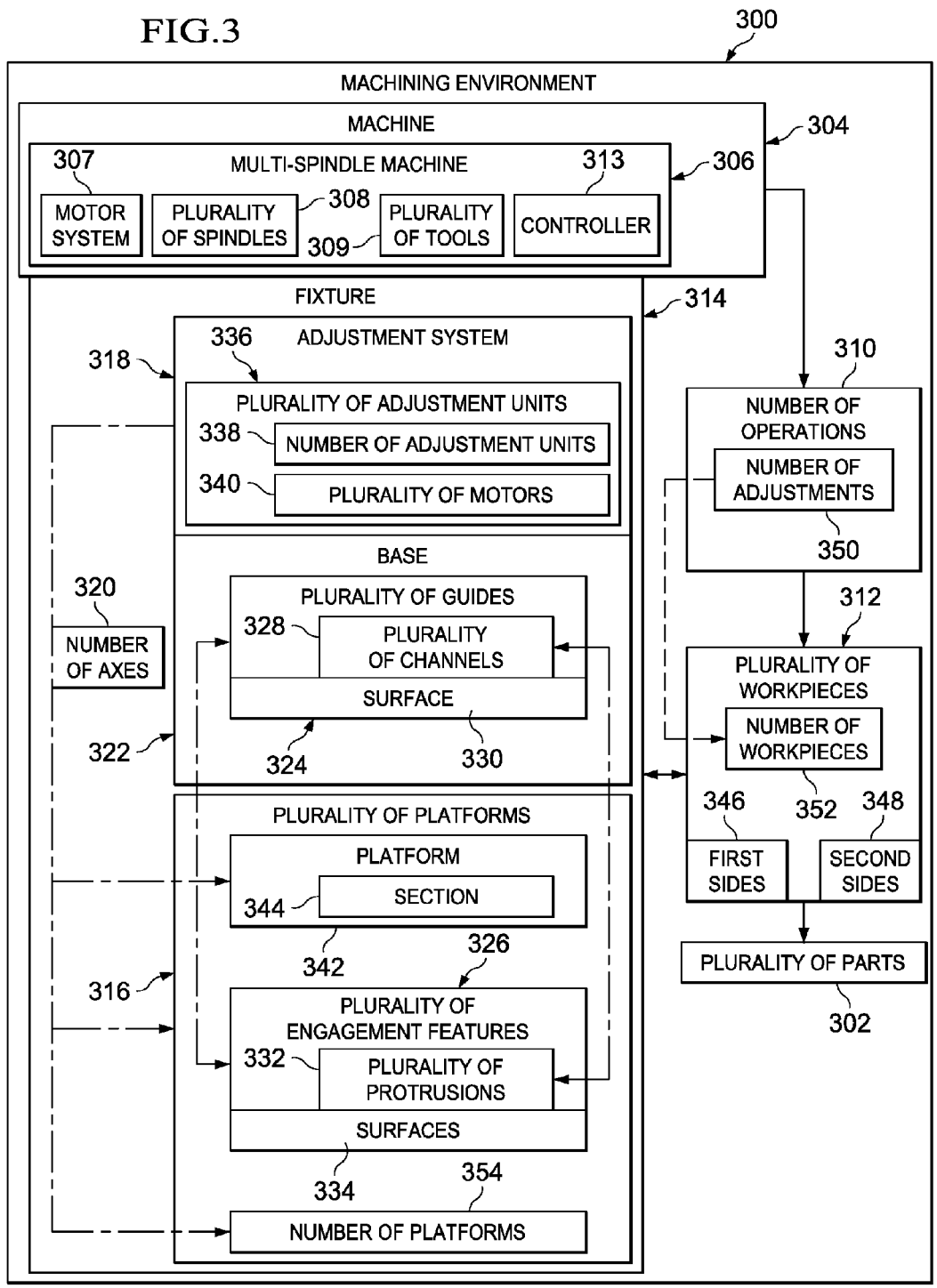
FIG. 3 is an illustration of a machining environment in accordance with an advantageous embodiment.

With reference now to FIG. 3, an illustration of a machining environment is depicted in accordance with an advantageous embodiment. Machining environment 300 may be used to manufacture plurality of parts 302 for use in aircraft 200 in FIG. 2.

In this illustrative example, plurality of parts 302 may be fabricated using machine 304. Machine 304 may take the form of multi-spindle machine 306. Multi-spindle machine 306 may have motor system 307, plurality of spindles 308, and plurality of tools 309. Motor system 307 may be configured to rotate and/or move plurality of spindles 308. Multi-spindle machine 306 may be, for example, without limitation, a milling machine, a drill press, a lathe, or some other suitable type of machine having plurality of spindles 308.

In this illustrative example, machine 304 also may include controller 313. Controller 313 may be, for example, without limitation, at least one of a processor unit, a microprocessor, a multi-core processor, a central processing unit, a digital signal processor, an application specific integrated circuit, and/or some other suitable device. Additionally, controller 313 also may include a memory to store a program to control the operation of machine 304.

Machine 304 may perform number of operations 310 on plurality of workpieces 312. Plurality of workpieces 312 may have one or more layers through which number of operations 310 is performed. For example, without limitation, in some advantageous embodiments, plurality of workpieces 312 may be comprised of a composite material with one or more layers through which number of operations 310 may be performed. For example, without limitation, plurality of workpieces 312 may be at least one of a plurality of metal blocks, aluminum blocks, plastic blocks, or some other suitable type of material.

In this illustrative example, fixture 314 may be associated with multi-spindle machine 306. Plurality of workpieces 312 may be held by fixture 314 during the performance of number of operations 310 on plurality of workpieces 312. Fixture 314 may provide a capability to independently move each of plurality of workpieces 312 independently from others in plurality of workpieces 312. In this illustrative example, fixture 314 may comprise plurality of platforms 316 and adjustment system 318. Each platform in plurality of platforms 316 may be configured to hold a workpiece within plurality of workpieces 312 during number of operations 310 performed by multi-spindle machine 306.

Plurality of platforms 316 may be configured for use with multi-spindle machine 306. Each of plurality of platforms 316 may be individually moveable with respect to others in plurality of platforms 316 along number of axes 320. Number of axes 320 may be, for example, without limitation, with respect to plurality of workpieces 312 or plurality of platforms 316. These axes may be, for example, at least one of an x-axis, a y-axis, and a z-axis. Plurality of spindles 308 may not independently move with respect to each other.

Adjustment system 318 may be configured to move each of plurality of platforms 316 along number of axes 320 independently from others in plurality of platforms 316. Movement of one or more of plurality of platforms 316 using adjustment system 318 may be performed at different times including at least one of before, between, during, and after number of operations 310.

In this illustrative example, fixture 314 also may include base 322. Plurality of guides 324 may be present in base 322. Additionally, plurality of engagement features 326 may be present on plurality of platforms 316. Plurality of engagement features 326 may be configured to engage plurality of guides 324. When plurality of engagement features 326 is engaged with plurality of guides 324, plurality of platforms 316 may be individually moveable by adjustment system 318.

In one illustrative example, plurality of guides 324 may take the form of plurality of channels 328. Plurality of channels 328 may be in surface 330 of base 322. Plurality of engagement features 326 may take the form of plurality of protrusions 332 from surfaces 334 of plurality of platforms 316. Plurality of protrusions 332 may be configured to be moveably placed within plurality of channels 328. In other words, plurality of platforms 316 may be moved along plurality of channels 328 using adjustment system 318.

In this illustrative example, adjustment system 318 may comprise plurality of adjustment units 336. Number of adjustment units 338 may be present for each of plurality of platforms 316. In these illustrative examples, plurality of adjustment units 336 in adjustment system 318 may take the form of plurality of motors 340. Each of plurality of motors 340 may be configured to move a platform in plurality of platforms 316 along number of axes 320.

In one illustrative example, platform 342 in plurality of platforms 316 may be moved along number of axes 320 by number of adjustment units 338 in plurality of adjustment units 336. In some advantageous embodiments, more than one adjustment unit within number of adjustment units 338 may be used to move platform 342 along different axes within number of axes 320.

In operation, number of operations 310 may be performed on both first sides 346 and second sides 348 of plurality of workpieces 312. For example, without limitation, a portion of number of operations 310 may be performed on first sides 346 of plurality of workpieces 312.

Thereafter, a determination may be made as to whether number of adjustments 350 may need to be made on number of workpieces 352 within plurality of workpieces 312. Number of adjustments 350 may be made by moving number of platforms 354 in plurality of platforms 316 along number of axes 320. In some advantageous embodiments, number of adjustments 350 may be made on number of workpieces 352 during at least one of during and after the performance of number of operations 310 on plurality of workpieces 312.

In this manner, adjustments may be made with respect to changes in plurality of workpieces 312 that may not be taken into account by adjustments that may be made to plurality of spindles 308 or plurality of tools 309 for multi-spindle machine 306.

In some advantageous embodiments, platform 342 may comprise section 344 in which each section in platform 342 may move in a direction along a different axis in number of axes 320. In this manner, number of adjustments 350 may be made to number of workpieces 352 in plurality of workpieces 312 individually. Using one or more of the different advantageous embodiments, changes or modifications to the manner in which plurality of spindles 308 operates may be avoided.

The illustration of machining environment 300 in FIG. 3 is not meant to imply physical or architectural limitations to the manner in which other advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, an additional number of machines, in addition to machine 304, may be present in machining environment 300.

Figure 4:
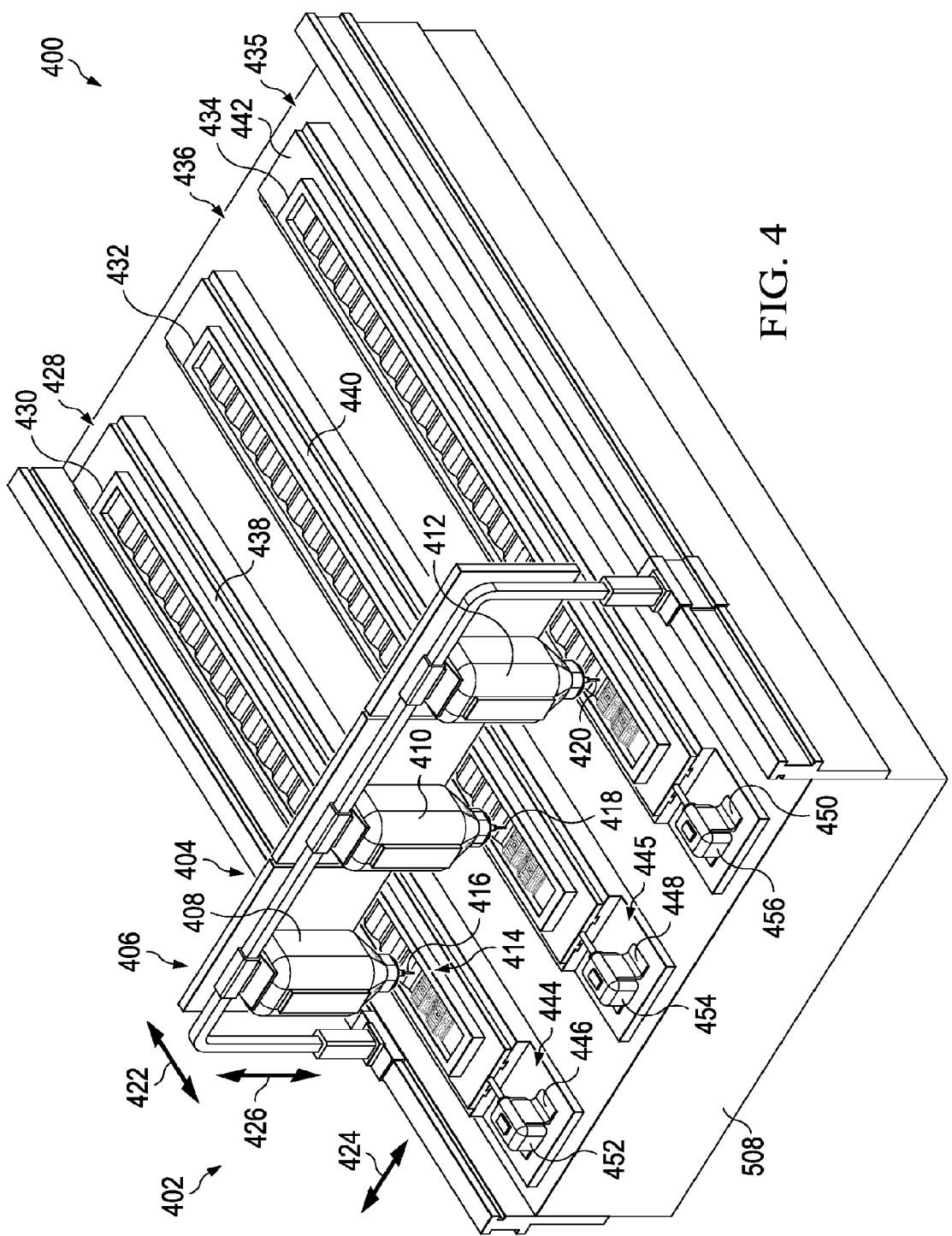
FIG. 4 is an illustration of a machining environment in accordance with an advantageous embodiment.

With reference now to FIG. 4, an illustration of a machining environment is depicted in accordance with an advantageous embodiment. In this illustrative example, machining environment 400 is an example of one implementation for machining environment 300 in FIG. 3.

As illustrated, machining environment 400 may comprise machine 402. Machine 402, in this illustrative example, may take the form of multi-spindle machine 404. Multi-spindle machine 404 may have plurality of spindles 406, which may include spindle 408, spindle 410, and spindle 412.

Plurality of tools 414 may be associated with plurality of spindles 406. Plurality of spindles 406 may rotate plurality of tools 414 to perform operations, such as machining operations. In this illustrative example, plurality of tools 414 may include tools 416, 418, and 420.

As depicted, plurality of spindles 406 with plurality of tools 414 may move in a direction of at least one of x-axis 422, y-axis 424, and z-axis 426 in these illustrative examples. Plurality of spindles 406 with plurality of tools 414 may be used to perform a number of operations on plurality of workpieces 428. Plurality of workpieces 428 may comprise workpiece 430, workpiece 432, and workpiece 434.

In this illustrative example, plurality of workpieces 428 may be held on fixture 435 during the performance of operations on plurality of workpieces 428. Fixture 435 may include plurality of platforms 436 and base 508. Plurality of platforms 436 may include platform 438, platform 440, and platform 442. As depicted, platform 438, platform 440, and platform 442 each rest on base 508. As illustrated, workpiece 430 may be held on platform 438, workpiece 432 may be held on platform 440, and workpiece 434 may be held on platform 442.

In these illustrative examples, plurality of platforms 436 may be moved or adjusted in the direction of x-axis 422. This adjustment may be performed using adjustment system 444. Each of plurality of platforms 436 for fixture 435 may be individually moveable with respect to others in plurality of platforms 436.

For example, without limitation, platform 438 may be moved, while platform 440 and platform 442 may remain stationary. In other advantageous embodiments, platform 440 and platform 438 may be moved, while platform 442 may remain stationary.

In yet other advantageous embodiments, all of the platforms may be moved by different amounts with respect to each other. Of course, any combination of different movements may be made, since each platform may be moved individually with respect to the other platforms within plurality of platforms 436.

In these depicted examples, adjustment system 444 may comprise plurality of adjustment units 445. As illustrated, plurality of adjustment units 445 may include adjustment units 446, 448, and 450. These adjustment units may be motors 452, 454, and 456. Motors 452, 454, and 456 may be associated with platforms 438, 440, and 442, respectively. Operation of motors 452, 454, and 456 may cause platforms 438, 440, and 442, respectively, to move along x-axis 422 in these examples.

Figure 5:
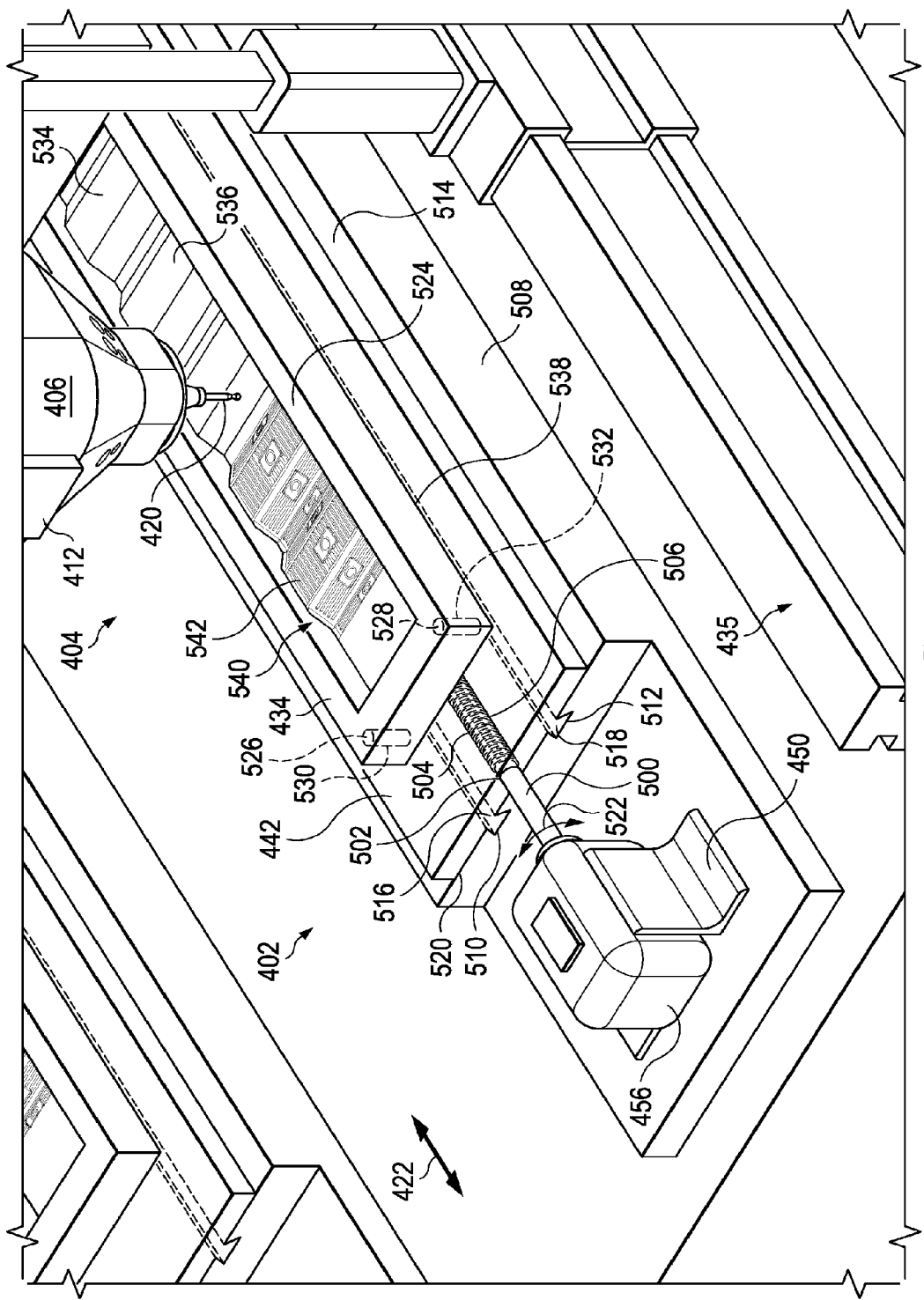
FIG. 5 is an illustration of a portion of a machining environment in accordance with an advantageous embodiment.

With reference now to FIG. 5, an illustration of a portion of a machining environment is depicted in accordance with an advantageous embodiment. In this illustrative example, a portion of machining environment 400 is depicted.

As illustrated, motor 456 may be associated with platform 442 in fixture 435 through shaft 500. Shaft 500 may be received in channel 502 in platform 442. Shaft 500 may have threaded section 504, which may be received within grooves 506 in channel 502.

As depicted, platform 442 may rest on base 508 in fixture 435. As depicted, base 508 may have channel 510 and channel 512 in surface 514. Platform 442 may have protrusion 516 and protrusion 518 on surface 520 of platform 442. In this example, surface 514 of base 508 may contact surface 520 of platform 442. Rotation of shaft 500 in the direction of arrow 522 may cause threaded section 504 of shaft 500 to engage grooves 506 in channel 502 of platform 442 in a manner that moves platform 442 in the direction of x-axis 422. In these illustrative examples, motor 456 may be operated by a human operator or a controller, such as controller 313 in FIG. 3.

In this illustrative example, workpiece 434 may take the form of aluminum block 524. Aluminum block 524 may be held on platform 442 by post 526 and post 528. Post 526 may be received in hole 530 in aluminum block 524, while post 528 may be received in hole 532 in aluminum block 524. Additional posts and holes may be present in aluminum block 524 but not shown in this example.

In this illustrative example, a number of operations have been performed on side 534 of workpiece 434. In this depicted example, web 536 may be formed in workpiece 434. Web 536 may be a surface that changes in a periodic fashion.

A number of operations also may be performed on side 538 of workpiece 434 to form web 536. In this manner, part 540 may be formed in workpiece 434. In this illustrative example, part 540 may take the form of structural member 542.

Figure 6:
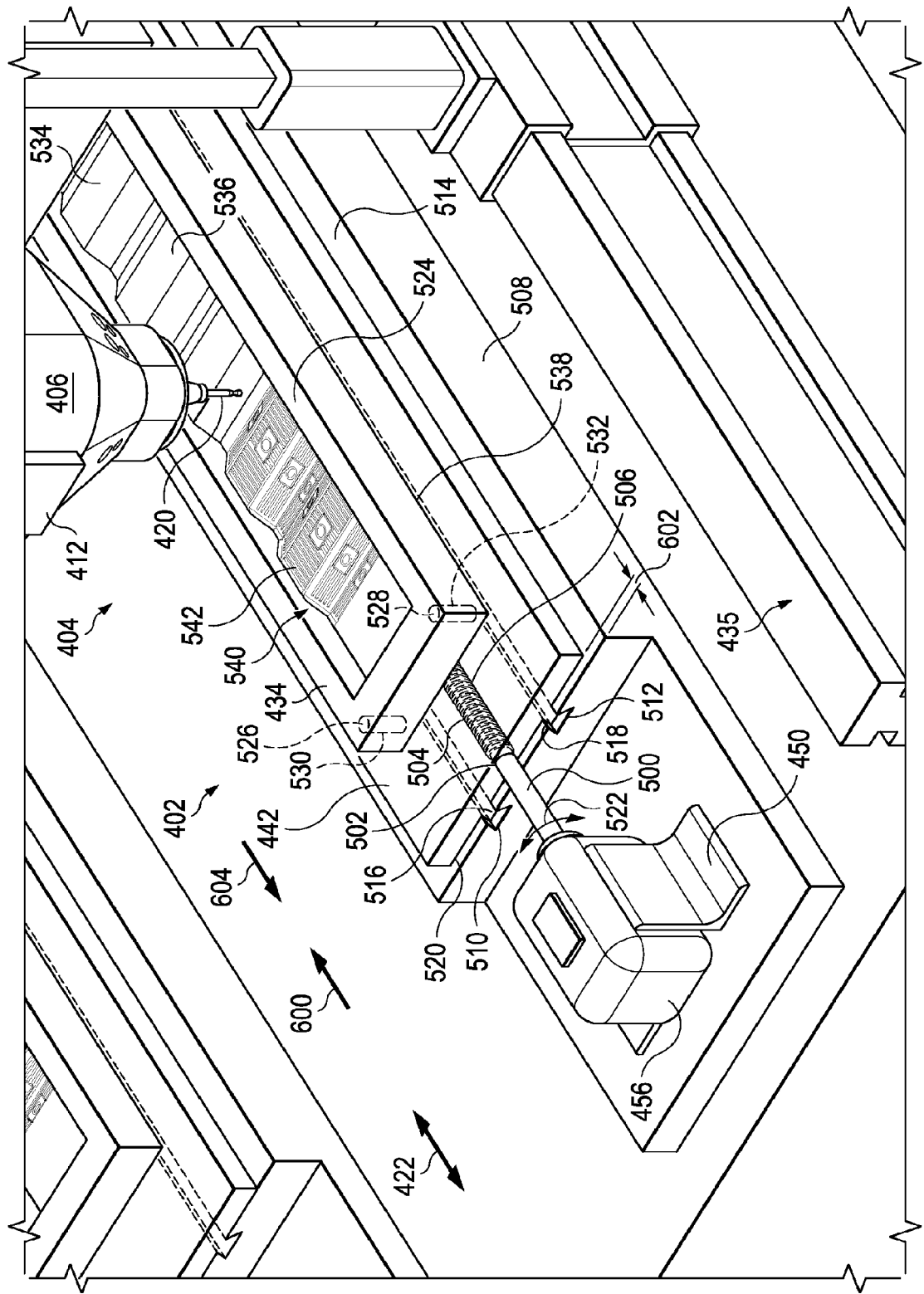
FIG. 6 is an illustration of a portion of a machining environment in accordance with an advantageous embodiment.

With reference now to FIG. 6, an illustration of a portion of a machining environment is depicted in accordance with an advantageous embodiment. In this illustrative example, platform 442 with workpiece 434 has been moved in the direction of arrow 600. This movement of platform 442 may be caused by motor 456 rotating shaft 500. Platform 442 may have been moved distance 602 in direction 600. Of course, platform 442 also may be moved in the direction of arrow 604, depending on the particular implementation.

With this movement of platform 442, channel 510 and channel 512 with protrusion 516 and protrusion 518 engaged in channels 510 and 512, respectively, may guide the movement of platform 442 in the direction of arrow 600 or arrow 604.

Figure 7:
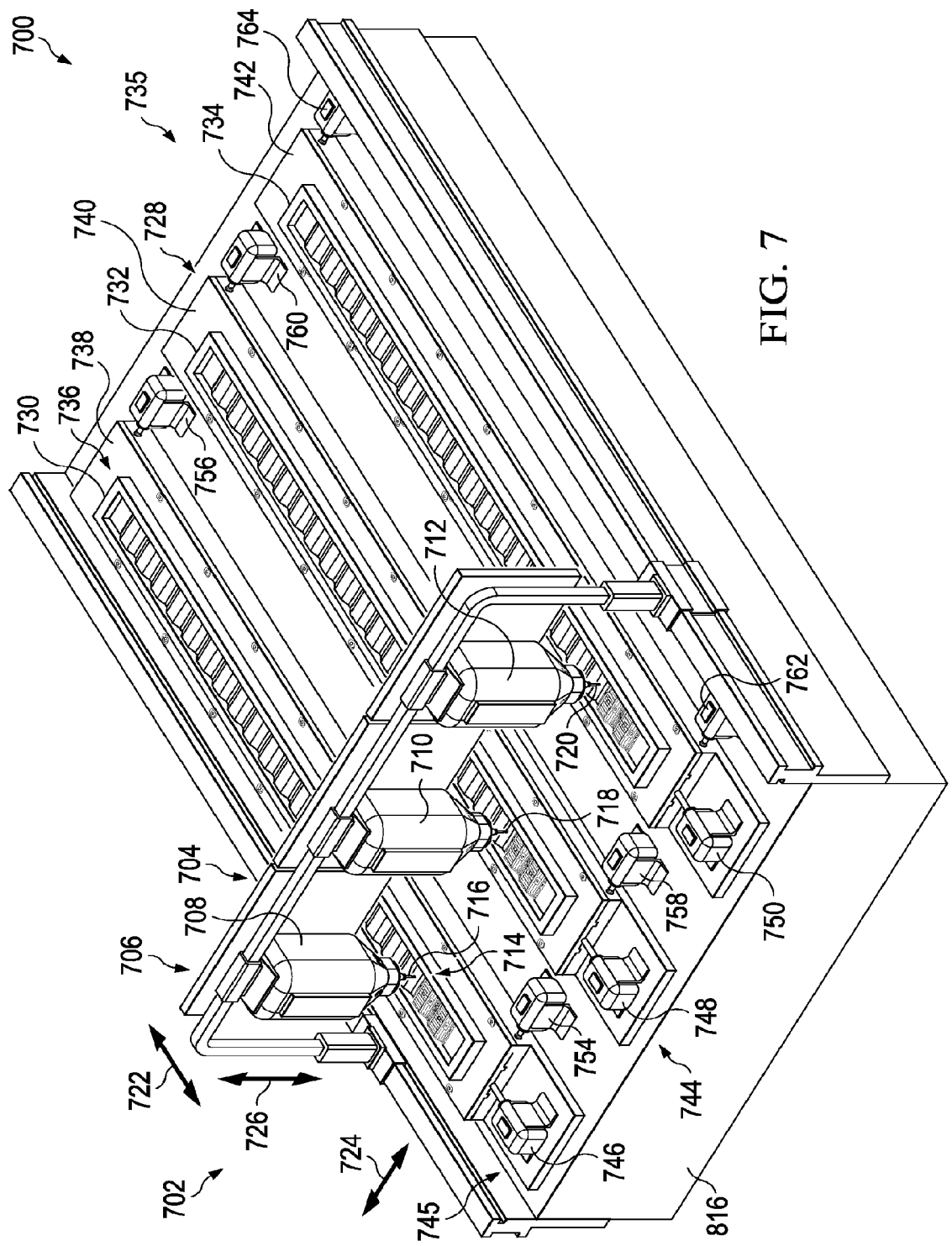
FIG. 7 is an illustration of a machining environment in accordance with an advantageous embodiment.

With reference now to FIG. 7, an illustration of a machining environment is depicted in accordance with an advantageous embodiment. In this illustrative example, machining environment 700 may include machine 702. Machine 702 may take the form of multi-spindle machine 704.

As illustrated, machine 702 may include plurality of spindles 706. Plurality of spindles 706 may comprise spindle 708, spindle 710, and spindle 712. Plurality of tools 714 may be associated with plurality of spindles 706. As depicted, plurality of tools 714 may include tool 716, tool 718, and tool 720. Plurality of spindles 706 and plurality of tools 714 may move in at least one of the direction of x-axis 722, y-axis 724, and z-axis 726.

In this illustrative example, a number of operations may be performed on plurality of workpieces 728 using plurality of tools 714. As illustrated, plurality of workpieces 728 may include workpiece 730, workpiece 732, and workpiece 734.

Plurality of workpieces 728 may be held on fixture 735. In this example, fixture 735 may include plurality of platforms 736 and base 816. Plurality of platforms 736 may comprise platform 738, platform 740, and platform 742. As depicted, platform 738, platform 740, and platform 742 each rest on base 816. Workpiece 730 may be held on platform 738. Workpiece 732 may be held on platform 740. Workpiece 734 may be held on platform 742.

Adjustment system 744 may be used to move each workpiece within plurality of workpieces 728 independently with respect to other workpieces in plurality of workpieces 728. The movement of plurality of workpieces 728 may occur through the movement of plurality of platforms 736 on which plurality of workpieces 728 may be held.

In this illustrative example, adjustment system 744 may include plurality of adjustment units 745. Plurality of adjustment units 745 may include adjustment units 746, 748, 750, 754, 756, 758, 760, 762, and 764. In these examples, these adjustment units also may take the form of motors.

As depicted, adjustment unit 746 may move platform 738 in the direction of x-axis 722. Adjustment unit 754 and adjustment unit 756 may move platform 738 in the direction along z-axis 726.

Adjustment unit 748 may move platform 740 in the direction along x-axis 722. Adjustment unit 758 and adjustment unit 760 may move platform 740 in a direction along z-axis 726. Adjustment unit 750 may move platform 742 in the direction of x-axis 722. Adjustment unit 762 and adjustment unit 764 may move platform 742 in the direction of z-axis 726. As can be seen in this example, plurality of platforms 736 may be moved in the direction of two axes instead of one axis.

Figure 8:
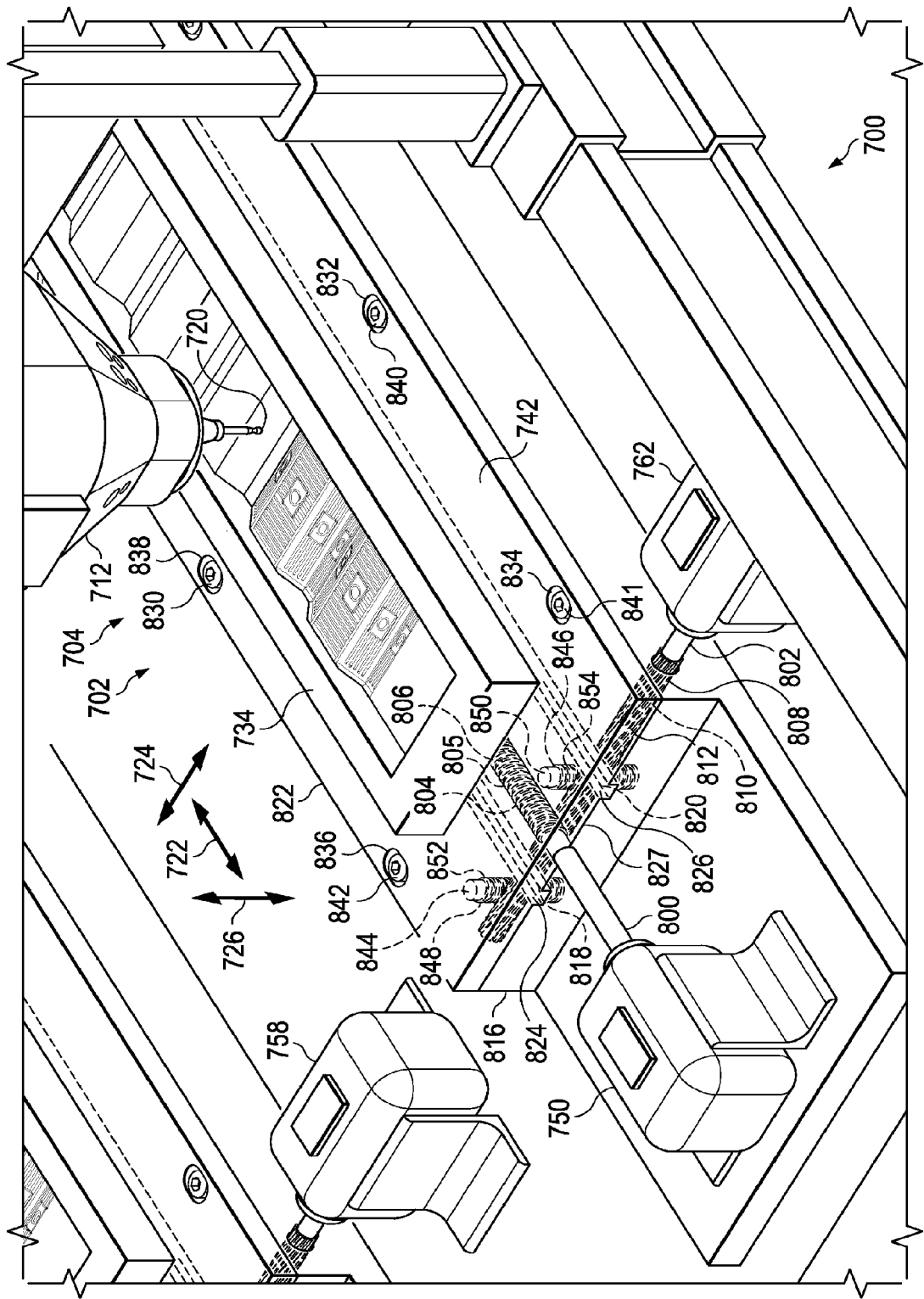
FIG. 8 is an illustration of a portion of a machining environment in accordance with an advantageous embodiment.

Turning now to FIG. 8, an illustration of a portion of a machining environment is depicted in accordance with an advantageous embodiment. In this illustrative example, a more detailed portion of machining environment 700 is depicted in accordance with an advantageous embodiment.

Adjustment unit 762 may have shaft 802. Shaft 800 may be located within channel 804 of platform 742. Channel 804 may have grooves 805. Shaft 800 may have threaded section 806. In a similar fashion, shaft 802 may be located within channel 808 of base 816. Shaft 802 also may have threaded section 810. Channel 808 may have grooves 812.

In this illustrative example, platform 742 may rest on base 816. Base 816 may have channel 818 and channel 820 on surface 822. Protrusion 824 and protrusion 826 may be located on surface 827 of platform 742. Protrusion 824 may move within channel 818, while protrusion 826 may move within channel 820. In these examples, this movement may be in the direction of x-axis 722.

This amount of movement may be limited by guides 830, 832, 834, and 836. These guides may receive posts 838, 840, 841, and 842. These guides and posts may limit the amount of movement of platform 742 in a direction along x-axis 722. The dimension of the platforms 738, 740, and 742 depicted in FIGS. 7-10 extending in the Y-axis direction 724 is merely a schematic representation of that dimension.

In addition, platform 742 also may have a number of additional engagement features that allow platform 742 to move in the direction of z-axis 726. For example, platform 742 may have channel 844 and channel 846. Base 816 may have shaft 848 and shaft 850. These shafts may bias or move platform 742 in the direction of z-axis 726. Additional channels and shafts also may be present on platform 742, which may not be shown in this example.

In these illustrative examples, shafts 848 and 850 may have threaded sections 852 and 854. Threaded sections 852 and 854 may engage threaded section 810 of shaft 802. Rotation of shaft 802 may cause shaft 848 and shaft 850 to move in a direction along z-axis 726.

In these illustrative examples, moveable posts 848 and 850 may have threaded sections 852 and 854. Threaded sections 852 and 854 may engage threaded section 810 of shaft 802. Rotation of shaft 802 may cause moveable post 848 and moveable post 850 to move in a direction along z-axis 726.

In operation, shaft 800 may be rotated by adjustment unit 750 to move platform 742 in the direction of x-axis 722. Adjustment unit 762 may rotate shaft 802 to move platform 742 in the direction of z-axis 726.

Figure 9:
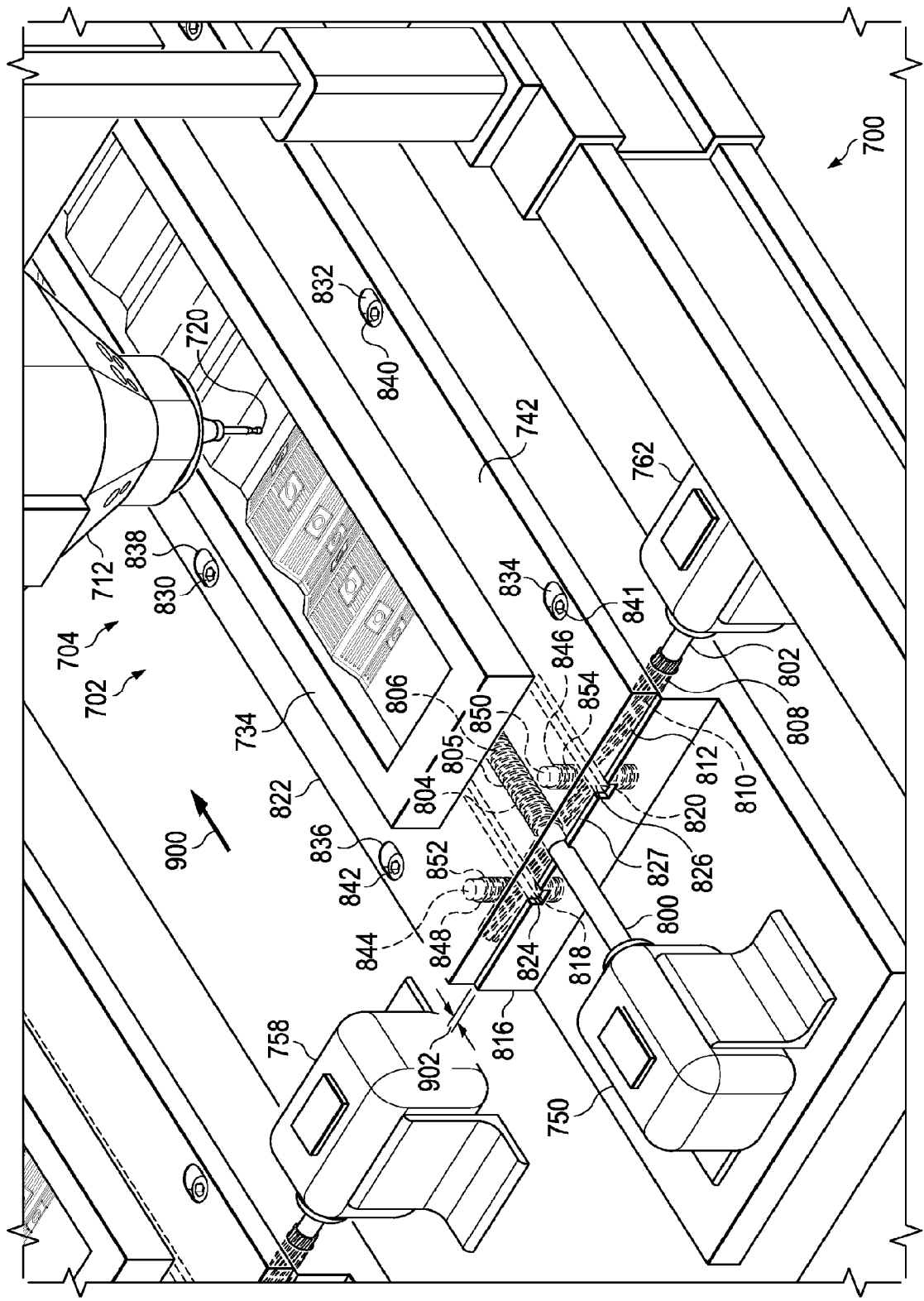
FIG. 9 is an illustration of a portion of a machining environment in accordance with an advantageous embodiment.

Turning now to FIG. 9, an illustration of a portion of a machining environment is depicted in accordance with an advantageous embodiment. In this illustrative example, adjustment unit 750 may have moved platform 742 in the direction of arrow 900 by distance 902.

Figure 10:
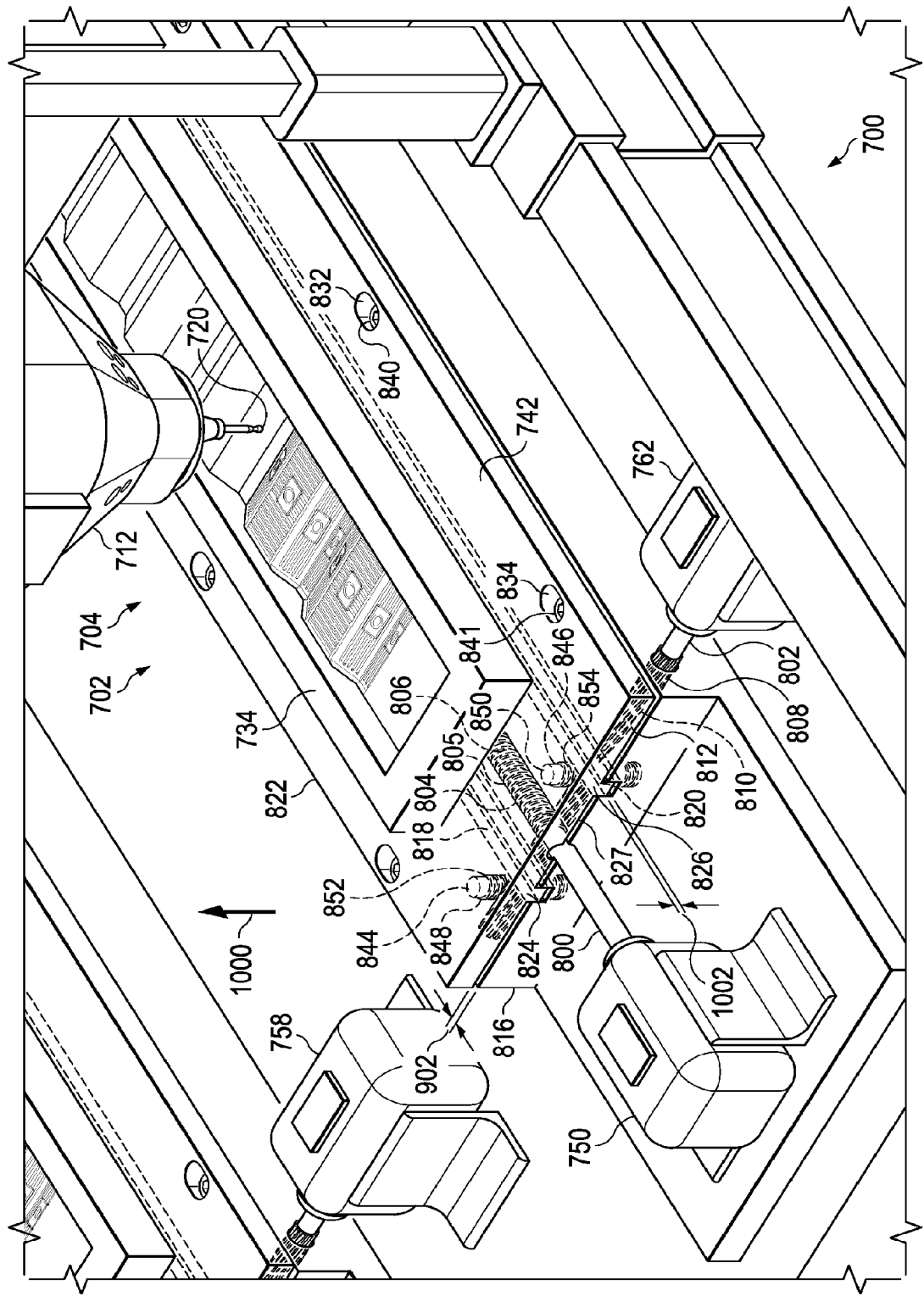
FIG. 10 is an illustration of a portion of a machining environment in accordance with an advantageous embodiment.

With reference now to FIG. 10, an illustration of a portion of a machining environment is depicted in accordance with an advantageous embodiment. In this illustrative example, adjustment unit 762 may have moved platform 742 in the direction of arrow 1000, which may be distance 1002.

Figure 11:
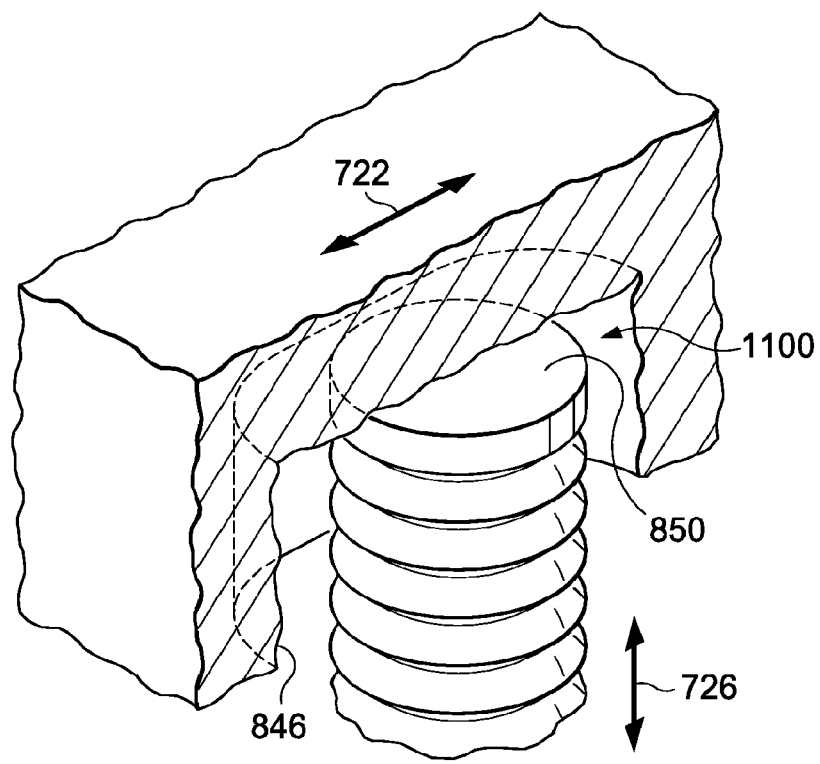
FIG. 11 is an illustration of a shaft in a channel in accordance with an advantageous embodiment.

With reference now to FIG. 11, an illustration of a shaft in a channel is depicted in accordance with an advantageous embodiment. In this illustrative example, a more detailed view of shaft 850 in channel 846 is depicted in accordance with an advantageous embodiment. In this illustrative example, channel 846 may have shape 1100, which may allow platform 742 in FIGS. 7-10 to move in the direction of x-axis 722 and/or z-axis 726. In this manner, shaft 850 may move in the direction of z-axis 726 to move platform 742 in a direction along z-axis 726. Additionally, channel 846 may allow for movement of platform 742 in FIGS. 7-10 in the direction of x-axis 722 in response to operation of adjustment unit 750.

Figure 12:
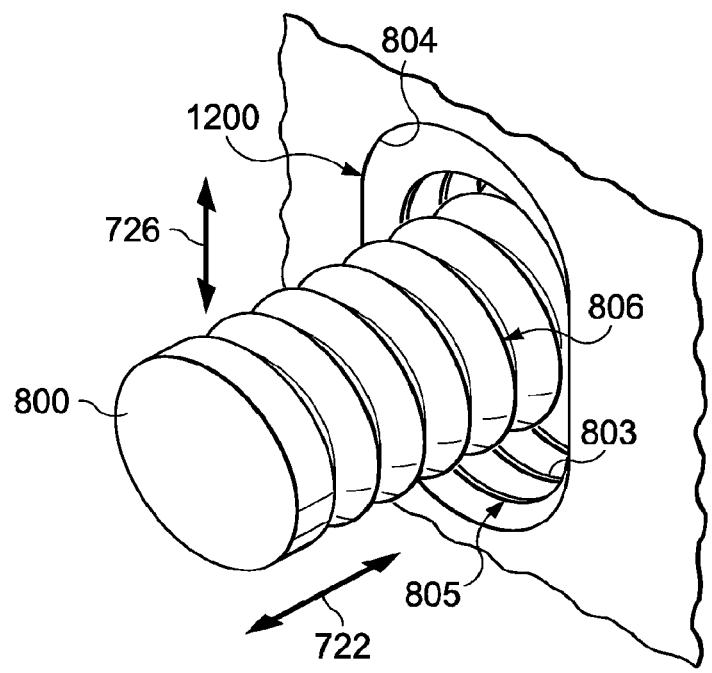
FIG. 12 is an illustration of a shaft in a channel in accordance with an advantageous embodiment.

With reference now to FIG. 12, an illustration of a shaft in a channel is depicted in accordance with an advantageous embodiment. In this illustrative example, a more detailed view of shaft 800 in channel 804 is depicted in accordance with an advantageous embodiment. Channel 804 may have shape 1200. Shape 1200 may be configured to allow platform 742 to move in the direction of z-axis 726. This movement of platform 742 in the direction of z-axis 726 may occur in a manner such that threaded section 806 remains engaged with grooves 805. In other words, although adjustments may be made in the direction of z-axis 726, threaded section 806 may remain engaged with grooves 805 in a manner that allows rotation of shaft 800 to move platform 704 in the direction of x-axis 722.

In the different advantageous embodiments, the movement of shaft 800, shaft 802, shaft 848, and shaft 848 in FIGS. 8-10 may be controlled using a number of different types of systems. For example, without limitation, a screw driver system, a linear actuator system, a hydraulic actuator system, a system involving cam follower bearings, a roller ball system, other suitable components, and/or some combination of the above components may be implemented to control movement of shaft 800, shaft 802, shaft 848, and shaft 848. Any system that allows movement of platform 742 in the x-axis 722, y-axis 724, and/or z-axis 726 may be used.

The illustrations of machining environment 400 in FIGS. 4-6 and machining environment 700 in FIGS. 7-12 are not meant to imply physical or architectural limitations to the manner in which different machining environments may be implemented. These particular embodiments are presented only as examples of some physical implementations for machining environment 300 in FIG. 3.

Other machining environments may include other features in addition to or in place of the ones illustrated. For example, in some machining environments, multi-spindle machine 404 and multi-spindle machine 704 may have two spindles, five spindles, or some other number of spindles. Fixture 435 and fixture 735 may have different numbers of platforms for the different numbers of spindles. In addition, in yet other advantageous embodiments, adjustment system 444 and adjustment system 744 may move the platforms in some other number of axes.

As yet another example of other implementations for other advantageous embodiments, other types of mechanisms other than post 526 in hole 530 and post 528 in hole 532 in aluminum block 524 may be used to hold aluminum block 524 in place. For example, without limitation, with other workpieces, the workpieces may have tabs or features that may be clamped or otherwise secured to a platform. Of course, any suitable mechanism capable of holding a workpiece in place during the performance of a number of operations may be used.

With reference now to FIG. 13, an illustration of a flowchart of a process for processing workpieces is depicted in accordance with an advantageous embodiment. The process illustrated in FIG. 13 may be performed using machining environment 300 in FIG. 3.

The process may begin by positioning plurality of tools 309 associated with multi-spindle machine 306 with respect to plurality of workpieces 312 on fixture 314 (operation 1300). Number of operations 310 may then be performed on plurality of workpieces 312 using multi-spindle machine 306 and fixture 314 (operation 1302), with the process terminating thereafter.

With reference now to FIG. 14, an illustration of a flowchart of a process illustrating performing a number of operations on a workpiece is depicted in accordance with an advantageous embodiment. The process illustrated in FIG. 14 may be an example of one implementation of operation 1302 in FIG. 13. Further, the process may be illustrated in machining environment 300 in FIG. 3.

The process may begin by machining first sides 346 of plurality of workpieces 312 on plurality of platforms 316 (operation 1400). In this illustrative example, operation 1400 may involve fully machining all of the features onto first sides 346 of plurality of workpieces 312. In fully machining features, additional operations on first sides 346 may not be needed to complete forming plurality of parts 302 from plurality of workpieces 312.

Thereafter, plurality of workpieces 312 may be turned over after machining first sides 346 such that second sides 348 of plurality of workpieces 312 may be positioned with respect to plurality of tools 309 (operation 1402).

The process may then partially machine second sides 348 of plurality of workpieces 312 (operation 1404). In operation 1404, partially machining sides of a workpiece may involve forming features for the workpiece. The features may be formed such that additional material may still be present for removal to finalize the features for the workpiece. These features may be, for example, the shape of the surface, which may include angles, protrusions, grooves, bends, and other suitable features.

The process may then identify number of adjustments 350 that may be needed for each of plurality of workpieces 312 (operation 1406). This operation may be performed by making various measurements on second sides 348 of plurality of workpieces 312. In the illustrative examples, plurality of workpieces 312 may have preselected locations or features, which may be measured using a number of different types of tools. For example, an ultrasonic gauge may be used to make measurements. These measurements may identify the location of these features with respect to other features. Depending on the measurements made, an adjustment for a particular workpiece may not be needed.

The process then may move number of platforms 354 using adjustment system 318 after partially machining second sides 348 of plurality of workpieces 312 (operation 1408). The process may then finish machining second sides 348 of plurality of workpieces 312 after moving number of the platforms 354 (operation 1410), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, without limitation, in some advantageous embodiments, the first sides may be partially machined with measurements being made to determine whether adjustments may be needed before finishing machining of the first sides. In yet other advantageous embodiments, the adjustments to the positions of the workpieces may be identified and made while the machining operations occur, rather than waiting for the machining operations to complete. In other words, the machining may occur while movement of the workpieces occurs using a controller and processes to identify changes needed while the machining occurs.

Thus, the different advantageous embodiments provide a method and apparatus for processing workpieces to form parts. In one advantageous embodiment, an apparatus may comprise a plurality of platforms and an adjustment system. The plurality of platforms may be configured for use with a multi-spindle machine in which each of the plurality of platforms may be individually moveable with respect to others in the plurality of platforms along a number of axes.

The plurality of platforms also may be configured to hold the plurality of workpieces in which each platform in the plurality of platforms may be configured to hold a workpiece in the plurality of workpieces during the number of operations performed by the multi-spindle machine. The adjustment system may be configured to move each of the plurality of platforms about the number of axes independently from others in the plurality of platforms.

With a capability to make adjustments in the positioning of the workpiece with respect to a tool in a multi-spindle machine, the different advantageous embodiments may provide a capability to provide for additional adjustments in forming parts from workpieces.

In the different advantageous embodiments, the different platforms may be moved independently from other platforms. In this manner, the different advantageous embodiments may take into account differences that may occur in features formed on workpieces in a multi-spindle machine. These adjustments may be made without modifying or requiring the different spindles in the multi-spindle machine to move independently of each other. As a result, the rate of production of parts from workpieces may increase. This increase may occur from having fewer parts being out of tolerance, requiring reworking, and/or being discarded.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a plurality of platforms configured for use with a multi-spindle machine, each platform of the plurality of platforms individually moveable with respect to other platforms of the plurality of platforms along a number of axes, and each platform of the plurality of platforms configured to hold a workpiece of a plurality of workpieces during a number of identical milling operations performed in parallel on the plurality of workpieces by the multi-spindle machine;
the multi-spindle machine, wherein the multi-spindle machine has a same number of spindles as a number of platforms of the plurality of platforms; and
an adjustment system configured to move each platform of the plurality of platforms along the number of axes independently from the other platforms of the plurality of platforms, wherein for achieving the movements of each platform of the plurality of platforms along the number of axes, the adjustment system comprises:
a plurality of adjustment units connected to the plurality of platforms, wherein each adjustment unit of the plurality of adjustment units is configured to move a platform of the plurality of platforms along an axis of the number of axes, wherein the plurality of adjustment units comprises a plurality of motors, wherein each of the plurality of adjustment units further comprises a respective shaft configured to be received into a respective channel in a respective platform of the plurality of platforms.

2. The apparatus of claim 1 further comprising:
a base;
a plurality of guides in the base; and
the plurality of platforms having a plurality of engagement features, each engagement feature of the plurality of engagement features configured to engage a respective guide of the plurality of guides in the base.

3. The apparatus of claim 2, wherein the plurality of guides comprise a plurality of channels in the base and the plurality of engagement features comprise a plurality of protrusions of the plurality of platforms, each protrusion of the plurality of protrusions configured to be moveably located in a respective channel of the plurality of channels.

4. The apparatus of claim 1, wherein the multi-spindle machine comprises:
the spindles, each spindle of the spindles configured to receive a tool of a plurality of tools, the spindles configured to move together along a plurality of axes to perform the number of identical milling operations on the plurality of workpieces in parallel;
and a motor system configured to rotate the spindles with the plurality of tools during a milling operation.

5. The apparatus of claim 1, wherein the plurality of platforms and the adjustment system form a fixture.

6. The apparatus of claim 1, wherein the plurality of workpieces comprises a plurality of structures for an aircraft.

7. The apparatus of claim 1, wherein each respective shaft has a respective threaded section, and wherein each respective channel is configured to receive the respective threaded section.

8. The apparatus of claim 1 wherein the adjustment system is configured to move each platform of the plurality of platforms in a direction along a z-axis of the number of axes.

9. A machining environment comprising:
a multi-spindle machine having a plurality of spindles and a motor system, the plurality of spindles configured to move together along a plurality of axes and receive a plurality of tools, the motor system configured to rotate the plurality of spindles with the plurality of tools during a number of milling operations on a plurality of workpieces, the number of milling operations performed in parallel;

a plurality of platforms configured for use with the multi-spindle machine, each platform of the plurality of platforms individually moveable with respect to other platforms of the plurality of platforms along a number of axes, and each platform of the plurality of platforms configured to hold a workpiece of the plurality of workpieces during the number of milling operations performed by the multi-spindle machine;

an adjustment system configured to move the each of the plurality of platforms along the number of axes independently from the others of the plurality of platforms, the adjustment system comprising a plurality of motors connected to the plurality of platforms, each motor in the plurality of motors configured to move a platform of the plurality of platforms along an axis of the number of axes, wherein for achieving the movements of the plurality of platforms along the number of axes, a number of motors of the plurality of motors are each connected to a respective shaft configured to be received into a respective channel in a respective platform of the plurality of platforms;

a base;

a plurality of channels in the base; and the plurality of platforms having a plurality of protrusions configured to be moveably located in the plurality of channels in the base.

10. The machining environment of claim 9, wherein the multi-spindle machine has a same number of spindles as a number of platforms in the plurality of platforms.

11. An apparatus comprising:

a base;

a plurality of channels in the base;

a plurality of platforms configured for use with a multi-spindle machine, each platform of the plurality of platforms individually moveable with respect to other platforms of the plurality of platforms along a number of axes, and each platform of the plurality of platforms configured to hold a workpiece of a plurality of workpieces during a number of milling operations performed in parallel on the plurality of workpieces by the multi-spindle machine, each platform of the plurality of platforms having a respective protrusion configured to be moveably located in a respective channel of the plurality of channels; and an adjustment system configured to move each platform of the plurality of platforms along the number of axes independently from the other platforms of the plurality of platforms, wherein for achieving the movements of each platform of the plurality of platforms along the number of axes, the adjustment system comprises:

a plurality of adjustment units connected to the plurality of platforms, wherein each adjustment unit of the plurality of adjustment units is configured to move a platform of the plurality of platforms along an axis of the number of axes, wherein the plurality of adjustment units comprises a plurality of motors, wherein a number of adjustment units of the plurality of adjustment units further comprises a respective shaft configured to be received into a respective channel in a respective platform of the plurality of platforms.

12. The apparatus of claim 11, wherein a respective surface of each of the plurality of platforms contacts a surface of the base.

13. The apparatus of claim 11 wherein the adjustment system is configured to move each platform of the plurality of platforms in a direction along a z-axis of the number of axes.

14. A machining environment comprising:

a base;

a plurality of channels in the base;

a plurality of platforms configured for use with a multi-spindle machine, each platform of the plurality of platforms individually moveable with respect to other platforms of the plurality of platforms along a number of axes, and each platform of the plurality of platforms configured to hold a workpiece of a plurality of workpieces during a number of milling operations performed by the multi-spindle machine, each platform of the plurality of platforms having two respective protrusions each protrusion configured to be moveably located in a respective channel of the plurality of channels;

the multi-spindle machine having a plurality of spindles and a motor system, the plurality of spindles configured to move together along a plurality of axes and receive a plurality of tools, the motor system configured to rotate the plurality of spindles with the plurality of tools during the number of milling operations on the plurality of workpieces, the number of milling operations performed in parallel, wherein the multi-spindle machine has a same number of spindles as a number of platforms in the plurality of platforms;

the plurality of workpieces; and an adjustment system configured to move the each of the plurality of platforms along the number of axes independently from the others of the plurality of platforms, the adjustment system comprising a plurality of motors connected to the plurality of platforms, each motor in the plurality of motors configured to move a platform of the plurality of platforms along an axis of the number of axes, wherein the adjustment system is configured to move each platform of the plurality of platforms in a direction along a z-axis of the number of axes, and wherein for achieving the movements of the plurality of platforms along the number of axes, a number of motors of the plurality of motors are each connected to a respective shaft configured to be received into a respective channel in a respective platform of the plurality of platforms.

* * * * *